(12) United States Patent
Shi et al.

(10) Patent No.: US 12,394,776 B2
(45) Date of Patent: Aug. 19, 2025

(54) ELECTRODE FOR ENERGY STORAGE DEVICE

(71) Applicant: AM Batteries, Inc., Billerica, MA (US)

(72) Inventors: Jay Jie Shi, Acton, MA (US); Omri Flaisher, Litchfield, NH (US); Yan Wang, Acton, MA (US); Heng Pan, St. Louis, MO (US)

(73) Assignee: AM Batteries, Inc., Billerica, MA (US)

( * ) Notice: Subject to any disclaimer, the term of this patent is extended or adjusted under 35 U.S.C. 154(b) by 83 days.

(21) Appl. No.: 17/885,066

(22) Filed: Aug. 10, 2022

(65) Prior Publication Data

US 2023/0246160 A1 Aug. 3, 2023

Related U.S. Application Data

(62) Division of application No. 17/713,722, filed on Apr. 5, 2022, now abandoned.
(Continued)

(51) Int. Cl.
*H01M 4/04* (2006.01)
*H01M 4/62* (2006.01)
(Continued)

(52) U.S. Cl.
CPC ......... *H01M 4/0419* (2013.01); *H01M 4/621* (2013.01); *H01M 4/622* (2013.01);
(Continued)

(58) Field of Classification Search
CPC .. H01M 4/0419; H01M 4/0404; H01M 4/621; H01M 4/622; H01M 4/623;
(Continued)

(56) References Cited

U.S. PATENT DOCUMENTS 10,547,044 B2 1/2020 Wang et al.
11,011,737 B2 5/2021 Eskra et al.
(Continued)

FOREIGN PATENT DOCUMENTS

JP 2001351616 12/2001
JP 2011077014 4/2011

OTHER PUBLICATIONS

Hendricks, Electrostatics and Its Applications, A.D. Moore, ed., Wiley-Interscience, pp. 8-28, 29-56, 1973.
(Continued)

*Primary Examiner* — Laura Weiner
(74) *Attorney, Agent, or Firm* — McCarter & English, LLP

(57) ABSTRACT

An electrode for an electrochemical energy storage device formed from an electrostatic deposition process employs a composite particle including active material (AM) particle with adhered binder and optionally conductive particles formed with sufficient interaction forces between the individual ingredient particles to form an effective composite particle which can overcome particle separation during electrostatic charging, fluidization, and/or mechanical conveyance. Secondary binder particles undergo deagglomeration to form sub particles, which are adhered to the AM particles having a predetermined morphology. Smaller conductive particles, typically carbon black (CB) or similar carbon, are bound to the binder and adhere to the AM particles. The result is a composite particle adhered for withstanding separation forces imposed from electrostatic deposition onto a current collector. Application of a plurality of composite particles onto a conductive current collector in a uniform pattern and defined loading promotes robust energy density, power density, and cycle life for an electrochemical energy storage device.

4 Claims, 9 Drawing Sheets

Related U.S. Application Data

(60) Provisional application No. 63/304,907, filed on Jan. 31, 2022.

(51) Int. Cl.

| | |
|---|---|
| *H01M 4/02* | (2006.01) |
| *H01M 4/131* | (2010.01) |
| *H01M 4/134* | (2010.01) |
| *H01M 4/136* | (2010.01) |
| *H01M 4/1391* | (2010.01) |
| *H01M 4/1395* | (2010.01) |
| *H01M 4/1397* | (2010.01) |

(52) U.S. Cl.
CPC ...... *H01M 4/623* (2013.01); *H01M 2004/021* (2013.01); *H01M 4/0404* (2013.01); *H01M 4/131* (2013.01); *H01M 4/134* (2013.01); *H01M 4/136* (2013.01); *H01M 4/1391* (2013.01); *H01M 4/1395* (2013.01); *H01M 4/1397* (2013.01); *H01M 4/625* (2013.01)

(58) Field of Classification Search
CPC ............. H01M 4/1391; H01M 4/1395; H01M 2004/027; H01M 2004/028
See application file for complete search history.

(56) References Cited

U.S. PATENT DOCUMENTS

| | | | |
|---|---|---|---|
| 11,050,121 | B2 | 6/2021 | Eskra et al. |
| 11,394,017 | B2 | 7/2022 | Eskra et al. |
| 2003/0205835 | A1 | 11/2003 | Eastin et al. |
| 2005/0271798 | A1 | 12/2005 | Zhong et al. |
| 2006/0230962 | A1 | 10/2006 | Inukai et al. |
| 2010/0055569 | A1 | 3/2010 | Divigalpitiya et al. |
| 2010/0263910 | A1 | 10/2010 | Mitchell et al. |
| 2011/0104564 | A1 | 5/2011 | Matsui |
| 2017/0062798 | A1* | 3/2017 | Wang ................. H01M 4/0419 |
| 2017/0098818 | A1* | 4/2017 | Cheng ................. H01M 4/131 |
| 2019/0131626 | A1* | 5/2019 | Wang ................. H01M 4/0404 |
| 2020/0144591 | A1 | 5/2020 | Wang et al. |

OTHER PUBLICATIONS

Souheng, Electrostatic Charging and Deposition of Powder Coatings, Polymer-Plastics Technology and Engineering, 7:2, ppl 119-220, DOI: 10.1080/03602557608063114, 1976.

Abe, et al., Electrostatic Spray Deposition for Fabrication of Li-ion Batteries, Transactions of JWRI, vol. 44, No. 2, 2015.

Amin, et al., Characterization of Electronic and Ionic Transport in Li1-xNi0.33Mn0.33Co0.33O2 (NMC333) and Li1-xNi0.50Mn0.20Co0.30O2 (NMC523) as a Function of Li Content, Journal of the Electrochemical Society, 163 (8), A1512-A1517, 2016.

Ludwig, et al., Solvent-Free Manufacturing of Electrodes for Lithium-Ion Batteries, Scientific Reports, 6:23150; DOI: 10.1038/srep23105, 2016.

Nordson Corporation, Electrostatic Phenomena in Powder Coating New Methods of Improving Faraday-Cage Coating, Finish Quality and Uniformity, and Recoating Operations, 10 pages. 2017.

Wang et al., The Influence of Polyvinylidene Fluoride (PVDF) Binder Properties onf $LiNi_{0.33}Co_{0.33}Mn_{0.33}O_2$ (NMC) Electrodes Made by a Dry-Powder-Coating Process, Journal of the Electrochemical Socity, 166, A2151-A2157, 2019.

Wang, et al., Halide Electrolyte $Li_3InCl_6$-Based All-Solid-State Lithium Batteries With Slurry-Coated $LiNi_{0.8}Co_{0.1}Mn_{0.1}O_2$ Composite Cathode: Effect of Binders, Frontiers in Materials, Sec. Energy Materials, 8:727617. DOI: 10.3389/fmats.2021.72617; 2021.

U.S. Appl. No. 17/713,722, filed Apr. 5, 2022.
U.S. Appl. No. 63/304,907, filed Jan. 31, 2022.

* cited by examiner

ELECTRODE FOR ENERGY STORAGE DEVICE

CROSS-REFERENCE TO RELATED APPLICATIONS

The present application is a divisional patent application claiming priority benefit to a non-provisional patent application entitled "Electrode for Energy Storage Device," which was filed on Apr. 5, 2022, and assigned Ser. No. 17/713,722, which claims the benefit of a U.S. provisional application entitled "Electrode for Energy Storage Device," which was filed on Jan. 31, 2022, and assigned Ser. No. 63/304,907. The entire contents of the foregoing non-provisional and provisional applications are incorporated herein by reference.

BACKGROUND

1. Technical Field

The present disclosure is directed to electrochemical energy devices and associated methods for manufacture. The disclosed electrochemical energy devices generally include electrode(s), wherein the electrode(s) include coating layer(s) formed, at least in part, by depositing dry composite particles onto a conductive substrate by an electrostatic deposition process. The composite particles include an active material particle and binder particles surrounding the active material particle, the binder particles generally being formed from deagglomeration of binder agglomerates and adhering relative to the surface of the active material particle through particle-to-particle adherence forces.

2. Background Art

Electrochemical energy storage devices have electrodes that contain coating layers in communication with a conductive current collector layer, typically a copper or aluminum sheet. The coating layers may include cathode active materials and anode active materials, and are often combined with conductive materials and binder materials to form a structure that readily discharges and accepts charge (recharges) depending on an electric load or charging potential applied. The formation of the electrochemical active materials, binder and conductive particles can vary according to applicable battery chemistry and production method.

Conventional approaches to battery manufacturing employ a solvent-based approach to forming an electrode. This typically involves a binder solution or suspension for flowing or applying the electrochemical active material and conductive particles onto the conductive current collector foil. The conventional process generally involves solvents that impose handling, ventilation, safety issues, and require a drying time for the liquid solvent to evaporate or fuse the ingredients in the coated layer.

It is generally desirable to form a coating layer with an even dispersion of the electrochemical active materials, conductive particles and binder in a density that promotes electrical communication between the electrochemical active materials and current collectors to produce a battery with optimal energy density, power density and cycle life. Improvements in methods for application of coating layer(s) and in the electrochemical active materials formed thereby are desired. These and other objectives are satisfied by the methods and devices of the present disclosure.

SUMMARY

An electrode for an electrochemical energy storage device formed from an electrostatic deposition process is provided that employs a composite particle including electrochemical active material (or active material, "AM") particles with adhered binder particles and optionally conductive particles formed with sufficient interactions between the individual ingredient particles to form an effective composite particle which can overcome/resist particle separation forces during electrostatic charging and fluidization in the electrostatic deposition process.

Commercially available binder materials or conductive materials are generally available in the form of agglomerates, often called secondary particles, that are formed by physical interaction of a plurality of primary particles. According to the present disclosure, binder agglomerates undergo deagglomeration to form sub particles, which are adhered to the AM particles having a predetermined and/or desirable morphology. Of note, conductive agglomerates also form sub particles through deagglomeration. A sub particle comprises one or more primary particles with a smaller size than the original agglomerate. In forming the advantageous energy storage devices of the present disclosure, the binder particle(s) and conductive particle(s) are incorporated in form of sub particle(s).

Typically, according to the present disclosure, carbon black (CB) or similar carbon is bound to the binder and adheres to the AM particles together with the binder. The result is composite particle(s) that exhibit sufficient adhesion forces for withstanding separation forces imposed during the electrostatic deposition process. In a typical electrostatic spray deposition (ESD) process, composite particles as disclosed herein are aerated and fluidized by a gas flow and are carried by the gas flow to deposit on a conductive current collector in a uniform pattern and density. Alternate electrostatic deposition approaches may also be used.

The deposited composite particle layer on the current collector may be further densified according to the present disclosure to form an electrode for a battery. The uniformity of the deposited composite particle layer is crucial to the performance of the resulting battery. The uniformity of the deposited composite particle layer entails, inter alia, consistency of the chemical stoichiometry between the deposited layer and the feedstock powder mixture, and consistency of chemical stoichiometric and geometric consistency within the deposited layer.

There is substantial commercial interest in the battery industry to apply electrostatic deposition techniques to form a solvent-free electrode coating for Li-ion batteries. Solvent-free electrode coating technologies are attractive because, inter alia, ESD techniques can significantly reduce energy consumption in the manufacturing process and significantly reduce the manufacturing cost of batteries. In principle, use of an electrostatic deposition technique allows a simpler and more flexible electrode coating in the manufacture of energy storage devices due to direct deposition of composite electrode powders on metallic current collector(s) through an electrostatic spray deposition process.

In conventional applications, electrostatic deposition techniques are widely used in dry powder coating of conductive parts. In conventional applications of electrostatic deposition coating techniques, the coating layer quality, especially the coating layer uniformity, is directly related to and dependent on properties of the particles included in the coating powder. These properties include particle size, relative permittivity, conductivity, density, morphology, and the like. According to the present disclosure, the properties of the particles associated with the coating powder are selected such that an electrostatic deposition coating formed with the disclosed composite particles advantageously promote/deliver a uniform electrode for battery applications.

Configurations herein are advantageously able to satisfy a need for reliable batteries across a range of end use applications, including specifically electric vehicles (EVs), which impose a substantial current draw to provide adequate vehicle performance. Unfortunately, and as noted above, conventional approaches to battery manufacturing employ a solvent-based approach to forming an electrode. This typically involves a binder solution or suspension for flowing or applying the electrochemical active material and conductive particles onto the conductive current collector foil. The conventional process involves solvents that impose handling, ventilation, safety issues, and require a drying time for the liquid solvent to evaporate or fuse the ingredients in the coated layer. Accordingly, configurations herein substantially overcome the above shortcomings of solvent-based battery formulation by providing an electrode including a composite particle for a dry powder application onto a conductive current collector using an electrostatic deposition approach.

As disclosed herein, the desired morphology, or structure, of the composite particle(s) result from deagglomeration, mixing and adherence between ingredient particles to form an active material (AM) particle with an adhered binder and optionally, conductive particles, in a form that withstands the electrostatic deposition process. Once deposited onto a conductive current collector substrate, the disclosed AM particles form/define precise loading and microstructure for high performance batteries. Of note, "loading" is the unit coating layer mass over a specified area, usually in mg/cm².

As disclosed herein, advantageous electrodes are formed by electrostatic deposition of composite particles on a conductive current collector, thereby forming highly effective electrodes/electrochemical energy storage devices. The disclosed electrodes/electrochemical energy storage devices generally include a plurality of composite particles adapted for electrostatic deposition onto a conductive current collector substrate, wherein each composite particle includes one or more active material particles, binder particles surrounding the active material particle(s), and conductive particles adhered to the binder particles. The disclosed binder particles are generally formed through deagglomeration of binder agglomerates to form sub particles. The binder particles adhere to a surface of an active material particle through interaction forces that are sufficient to withstand the powder mixing process. The interactions are also sufficient to overcome separation forces induced from the electrostatic deposition process, which is ideal for maintaining a structure of the composite particle when formed onto the conductive current collector substrate via the electrostatic deposition process.

The disclosed electrochemical energy storage devices and methods of production thereof are highly advantageous in providing effective energy storage functionality without the need for a solvent-based manufacturing process.

Additional features, functions and benefits of the disclosed electrochemical energy storage devices and associated manufacturing methods will be apparent from the detailed description which follows, particularly when read in conjunction with the appended figures.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is an example method and apparatus for forming and deploying the composite particle in an electrochemical energy storage device, such as a rechargeable battery. Other particle deposition approaches may be employed for engaging the composite particles with a current collector or other energy storage apparatus to store and release electrical energy (electrons) for providing a current flow in a controlled and efficient manner.

As described herein, the term "particle" generally denotes a granular quantity of a particulate substance adapted for mixing and interacting with other particles. The morphology of particle can be spherical or any other form. Examples referring to an individual particle are intended to be illustrative of an occurrence or interaction affecting some or all of the particles in a granular quantity of particles, including powder and granulated forms. It should be further noted that, in battery terminology, "active charge material" is often referred to as "electrochemical active material" or "electrode active material." The electrostatically deposited material thus deposited as disclosed herein may, depending on context, be referred to as a "coating layer."

Agglomerations of particles often occur with bulk granular materials, including electrochemical active materials, binder materials, and conductive materials associated with manufacture of electrochemical energy storage devices according to the present disclosure. All of these materials take the form of particles, which may be in the form of agglomerates, meaning multiple primary particles interacting through relatively weak forces broken through agitation and mixing. Common nomenclature denotes the agglomerates as secondary particles and, once agitated, broken into primary particles, or sub-particles. While processes and methods discussed herein generally function to form discrete primary particles from the sub particles of broken, stirred or agitated agglomerates, a particle as defined herein includes primary particles, secondary particles, sub particles of agglomerates, and any interaction or bonding between particles of a particular type. Stated differently, although clusters of primary particles, often called secondary particles or agglomerates, are generally expected to disassociate into smaller particles upon agitation, certain agglomerations may remain and nonetheless define a particle of the respective active material, binder, or conductive material, meaning particles and/or any form of sub particles thereof. A particle may therefore be broken into multiple sub particles, each of which is still a particle, nonetheless. In addition, the force applied during the agitation process may be sufficient to pulverize the agglomerated particles.

Figure 1:
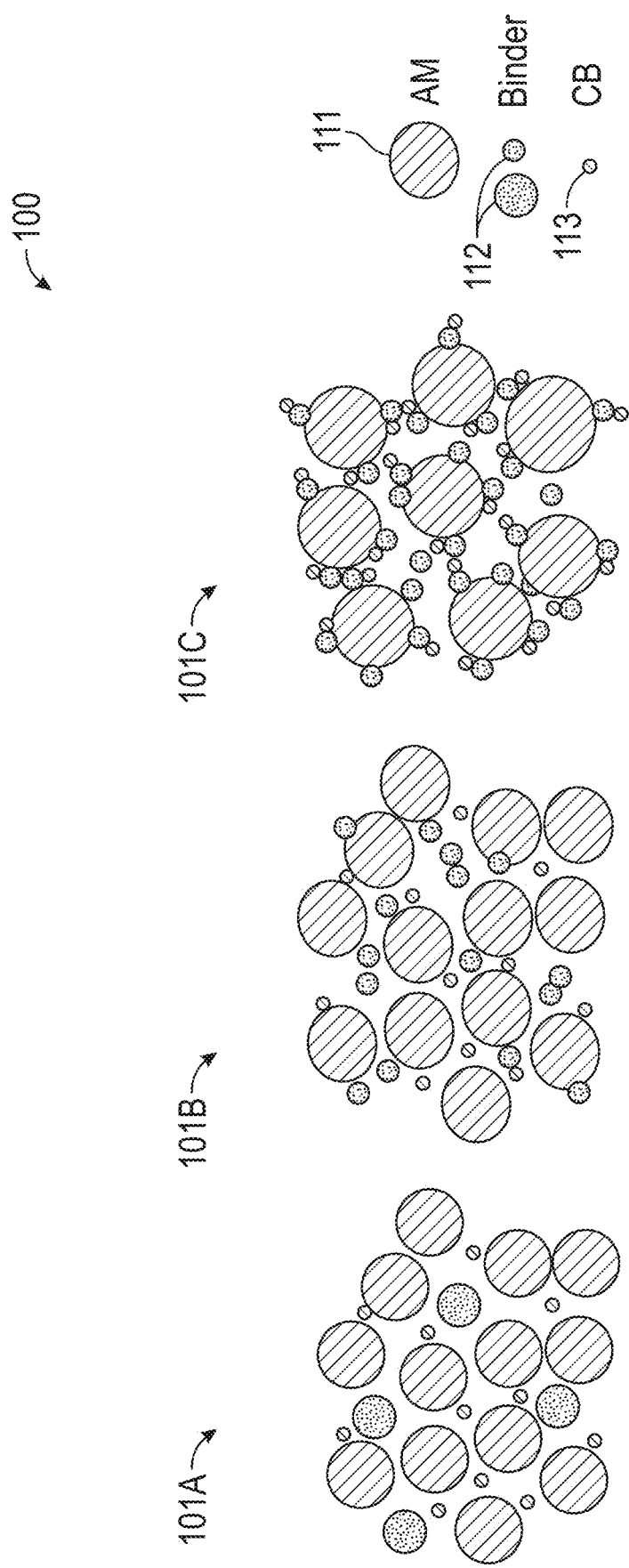
FIG. 1 is a diagram of a composite particle as disclosed herein.

FIG. 1 is a diagram of a composite particle as disclosed herein. Configurations herein apply a solvent-free (dry) electrostatic spray deposition (ESD) coating technique for battery composite electrode manufacturing with high uniformity. The present disclosure further enables composite powder mixing processes that produce suitable composite powder mixture for ESD electrode coating. Alternate applications include any electrochemical storage device such as fuel cells, for example.

A battery has a cathode and an anode. In a typical Li-ion battery, the cathode and anode are based on composite electrode powder mixtures. A composite electrode powder mixture generally contains active electrode material particles (AM), binder material particles (Binder) and conductive material particles (CB). The active electrode materials include cathode materials, such as lithium metal oxide based cathode materials: NCM (Lithium Nickel Cobalt Manganese Oxide), LMO (Lithium Manganese Oxide), NCA (Lithium Nickel Cobalt Aluminum Oxide), LCO (Lithium Cobalt Oxide) and lithium polyanion type cathode materials: LFP (Lithium Iron Phosphate), $LiMn_xFe_{1-x}PO_4$, $Li_2FeSiO_4$, and anode materials based on carbonaceous anode materials, graphite, Si, Si-based composites, SiOx, lithium alloyable materials, or lithium transition metal oxide anode materials. In a typical sodium-ion battery, the cathode materials include sodium transition metal oxide, such as $Na_{2/3}Fe_{1/2}Mn_{1/2}O_2$, sodium polyanion materials, such as $Na_2MnSiO_4$, Prussian Blue Analogues cathode materials, such as $Na_2MnFe(CN)_6$. And anode materials include carbonaceous anode, sodium alloyable materials, sodium transition metal oxide or Prussian Blue Analogues anode materials. The transition metal oxide-based cathode materials, such as NCM, are semi-conductors, with an electronic conductivity of $10^{-6}$ to $10^{-7}$ S/cm.

Typical binder materials are polymeric materials, such as PVDF (polyvinylidene fluoride), PTFE (Polytetrafluoroethylene), PEO (Polyethylene oxide) or PMMA (Poly(methyl methacrylate)), SBR (Polystyrene butadiene rubber binder), CMC (Carboxymethyl cellulose binder), or PAA (Polyacrylic acid), which are electrical insulators. The binder materials can also be polymer electrolytes, such as PEO/lithium triflate polymer electrolyte. Furthermore, the binder can be solid state electrolyte composites consisting of inorganic solid electrolytes and polymeric binders, polymer electrolyte binders or organic binders, such as $Li_3InCl_6$/PMMA composite, LLZO/polymer electrolyte composite.

Conductive materials may include carbon black (CB), carbon nanotubes, or graphene, which are electrically conductive. In addition, some functional additives may be included in the composite electrode. These additives may be, for example, silica, alumina, zirconium oxide or any combination of them.

The true density of the cathode material is generally 4-5 g/cc for NCM and 3.6 g/cc for LFP. The true density of binder is typically in the range of 1-2 g/cc. The typical particle size for active materials is in the range of 1-40 μm.

The binder material typically has a primary particle size of 100-1000 nm and agglomerate size of 5-30 μm. The conductive material typically has a primary particle size of 40-80 nm. The conductive current collectors are typically Al foil and Cu foil with or without prime layers to enhance adhesion between the coated layer and the conductive substrate. Such an adhesion layer may be applied to the conductive substrate prior to deposition.

Referring to FIG. 1, an electrode formed by electrostatic spay deposition (ESD) for an electrochemical energy storage device according to the present disclosure includes a plurality of composite particles adapted for electrostatic deposition onto a conductive current collector substrate. Each composite particle of the plurality of composite particles (or at least the vast majority of composite particles) includes an active material particle and binder particles surrounding the active material particle. Binder particles are formed by either breaking down binder agglomerates into sub particles or directly introducing pre-fabricated sub particles. In either case, the binder particles adhere to a surface of the active material particle through bonding forces greater than the interaction forces broken during agitation of the binder agglomerates. Conductive additives may be added to form the composite.

In FIG. 1, a range 100 of particles depict an example cathode material for an electrochemical energy storage device. In a composite electrode powder mixture, the active material weight ratio is usually above 80% and the binder and conductive material weight ratio is less than 20% to allow a sufficient gravimetric energy density and acceptable/beneficial power density for the battery. The composite electrode powder mixture is prepared by a mixing process to allow a uniform dispersion of ingredient particles. FIG. 1 illustrates several dispersion patterns of particles 101A, 101B and 101C of ingredient particles in a well-mixed composite electrode powder mixture through dry mixing. Ingredient particles include AM, binder and conductive particles; however in some configurations, conductive material is not needed in the composite electrode, as will be apparent in the discussion below.

In general, AM particles 111 are the largest, binder particles 112 are smaller but varied (shown as hatched shaded), and conductive particles 113 (shown solid) being of the smallest range. However, in particular implementations, sizes and size relationships may vary widely. In particle 101A, the binder 112 either has a large sub particle size or is in the form of agglomerates. The active material 111 particles keep their original morphology during dry mixing. In the static powder form, all particles are well dispersed but there exist no strong interactions between AM 111, binder 112, and CB (conductive) particles 113.

Particle 101B shows that the binder 112 agglomerates are broken in the mixing process and the sub particle size is smaller than the active material 111. The active material particles keep their original morphology during dry mixing. As with 101A, at the static powder form, the particles 111, 112 and 113 may be well dispersed but there exist no strong interaction forces between AM, binder, and CB particles.

Particle 101C depicts a composite particle where the binder agglomerates are broken in the mixing process and the sub particle 112 size is smaller than the active material 111. The active material particles remain in their original morphology during mixing. In the static powder form, binder particles and conductive particles are discretely coated on the surface of active material particles via surface fusion, Van Der Waal attraction forces, or a variety of potential physical interactions and chemical bonds. The composite particles 101C are adapted for electrostatic deposition onto a current collector substrate based on the sub particles of the binder, agitated to break down agglomerates, and the interaction forces are sufficient to withstand separation forces induced from material handling, electrostatic deposition and post-deposition handling, onto a substrate for maintaining the morphology of the composite particle 101C.

A variety of AM particle and composite particle formulations may be achieved. It should be noted of the distinction between the ingredient particles of AM, binder and conductive materials, generally obtained as a homogenous bulk granular material, and the formed composite particle formed from particle to particle interaction forces for electrostatic deposition. In an example arrangement, the active material is formed from transition metal oxides for an electrochemical energy storage device as cathode material. Typical cathode materials include NCM (Lithium Nickel Cobalt Manganese Oxide), LFP (Lithium Iron Phosphate), LCO (Lithium Cobalt Oxide) or other suitable formulation chemistry, typically based on a form to be able to accept and release lithium ions. Cathode materials may often be formulated from a proprietary process, as opposed to a bulk commodity, prior to deposition. Active material formed from the disclosed process may also be anode material for an electrochemical energy storage device. An exemplary deployment of the active material is for a rechargeable battery having a chemistry defined by rechargeable lithium batteries, Li-ion batteries, rechargeable Li—S batteries, solid state batteries, rechargeable sodium batteries, and sodium-ion batteries. The binder particles are generally formed from one or more of polymeric materials, polymer electrolytes and solid state electrolyte composites; several specific compounds are named above.

Figure 2:
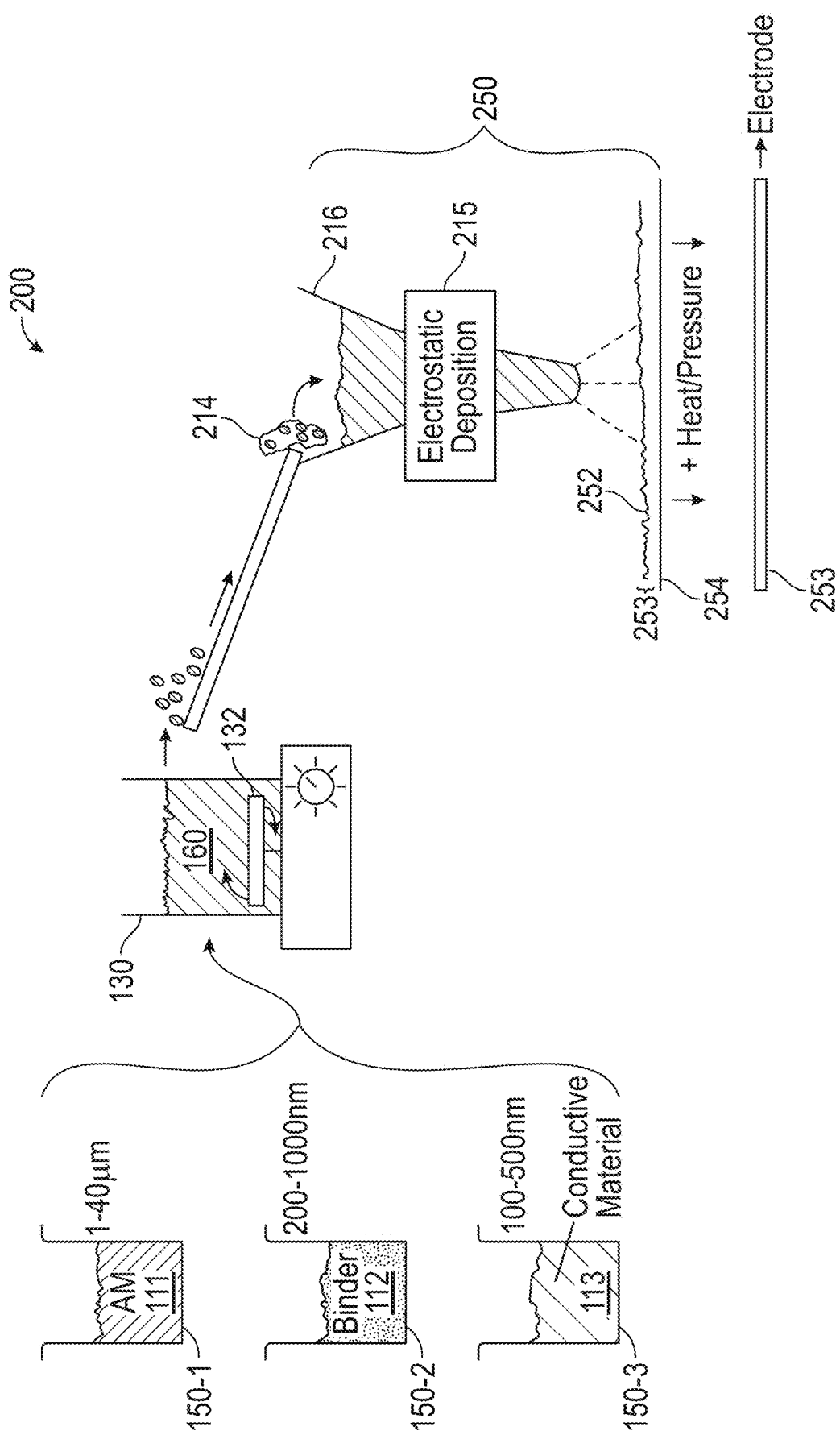
FIG. 2 shows a context for deploying the composite particle of FIG. 1 in an electrochemical energy storage device.

FIG. 2 shows a context for deploying the composite particle of FIG. 1 in a battery. An ESD manufacturing process 200 includes an electrostatic deposition applicator 215, and a hopper 216. The feedstock 214 includes a bulk quantity of composite particles 101C as described above. The composite particles 101C are generated from a mixer 130 having an agitator 132 or similar approach for mixing, combining and adhering the composite particles 101C. Sources of bulk particles include active material 150-1, binder particles 150-2, and optionally conductive particles 150-3 (150 generally). The sources 150 are fed to the mixer 130 in predetermined quantities, generally at least 80% weight ratio of the active material. The sources 150 result from any suitable commercial or industrial supply, typically as a homogenous bulk stock, and have a texture of a granular, particulate or powder. Particle and powder should be deemed interchangeable in the discussion herein.

Following agitation, the binder particles are usually between 200-1000 nm and the conductive particles between 100-500 nm. Once agitated, the mixer 130 contains a composite electrode mixture 160 for feedstock 214. AM particles typically range generally from 1-40 μm and are substantially larger than the adhered binder and conductive particles, discussed further below.

In an electrostatic deposition apparatus 250 as in FIG. 2, the composite particle of FIG. 1C is depicted as a constituent particle for cathode material. The active material may be either cathode material or anode material, formed from respective cathode material or anode material particles. Composite particles from feedstock 214 are aerated and fluidized by a pressured gas flow, usually dry air. The fluidized composite particles carried by the gas flow pass through the electrostatic applicator 215 to be charged, travel in the electric field and eventually deposit on the grounded conductive current collector 254 to form a composite particle layer 252. The composite particles fluidized and carried by the gas flow are charged by means of corona charging or tribo charging in the electrostatic applicator 215.

The product output by the electrostatic deposition manufacturing process 200 is the coated sheet 253, including the composite particle layer 252 and the substrate 254. The electrostatic deposition applicator 215 may be any suitable electrostatic deposition device. A spray process is often involved, but other electrostatic deposition approaches may be invoked. The coated sheet 253 is densified to form the electrode for an electrochemical energy storage device. The coated sheet 253 can be pre-heated before densification. The densification process can be under heating or without heating. Cathode or anode can be made by the above process. The densification process may be repeated, e.g., multiple times. For the electrostatic charging of composite particles, the electrostatic applicator may employ any suitable electrostatic approach. Electrostatic applications include corona charging, tribo charging, direct electrode induction charging, or other suitable charging processes.

An electrochemical energy storage device, such as Li-ion battery, has a cathode, anode, separator and electrolyte. The cathode typically comprises active material, such as NCM, binder material, such as PVDF, and conductive material, such as carbon black. The anode typically comprises active material, such as graphite, binder material, such as PVDF or SBR/CMC binder, and/or conductive material, such as carbon black. The separator typically is a porous polymer film, separating the cathode and anode and allowing ion transport between cathode and anode. The electrolyte typically is a lithium salt solution, such as a solution of $LiPF_6$ salt and EC/DMC/EMC solvent, which provide ionic conduction between the cathode and anode.

In a loading mode, or discharge mode, the anode undergoes oxidation and the cathode undergoes reduction. In charging, the anode undergoes reduction and the cathode undergoes oxidation. The energy stored in the electrochemical storage device depends on the electrochemical energy stored by the active material, but also the active material content in the electrode. Furthermore, the uniformity of current distribution in the electrochemical energy storage device significantly affects the cycle life of the device. The uniformity of current distribution is directly related to the uniformity of the electrode. The electrode structure properties, such as porosity and thickness, affect power capacity of the electrochemical energy storage device.

Characteristics affected by the formation and layering of the charge material include electrode uniformity, active material loading in the electrode, electrode porosity, electric conductivity, electrode processibility, which are directly related to energy density, power density and cycle life of the resulting battery.

In the electrostatic process 200, the charge of a particle is correlated to its relative permittivity and size through the following equation:

$$q(t) = 4\pi\varepsilon_0 \left(1 + 2\frac{\varepsilon_r - 1}{|\varepsilon_r + 2|}\right) r^2 \, E \frac{enkt}{4\varepsilon_0 + enkt}$$

Where:
r=radius of the particle,
E=electric field strength,
e=charge of an electron,
k=electron mobility, n=electron concentration,
t=time,
$\varepsilon_0$=absolute permittivity, and
$\varepsilon_r$=relative permittivity of powder The typical particle size range for cathode materials is in the range of 1-40 µm. The typical primary particle size of PVDF binder is 200-300 nm. The typical primary particle size of conductive carbon is 40-50 nm. From the above equation, since the maximum charge of the particle is directly related to the square of the particle radius, the charge of the individual powder constituents during electrostatic deposition will be orders of magnitude different.

The cathode materials usually have much higher relative permittivity than polymeric binder materials. For example, the relative permittivity of PVDF at 21° C. is about 8-10, and the relative permittivity of lithium nickel oxide-based cathode material is in the order of 1000.

The relaxation time t for charge dissipation from an ideal charged body is given by:

$$\tau = \varepsilon_0 \varepsilon_r / \sigma$$

where:
$\varepsilon_r$=relative permittivity of powder and
$\sigma$=electronic conductivity of powder The electronic conductivity of NCM cathode material is generally $10^{-6}$-$10^{-7}$ S/cm and PVDF<$10^{-14}$ S/cm, which results in several order magnitude difference in relaxation time for charge dissipation.

Based on the above analysis, due to significant difference in chargeability and charge dissipation time resulting from the difference in conductivity, permittivity, particle size and density, active material particles, binder particles and conductive material particles have different electrostatic deposition behaviors in the electrostatic deposition process.

Additionally, the differences in particle size, particle density, morphology, surface roughness, and thus surface energy will exhibit different behaviors as they relate to aerodynamic effects during powder fluidization and mechanical conveyance to the coated substrate.

If strong interaction forces do not exist between the particles in the mixture, due to the behavioral differences in electrostatic deposition and fluidization associated with powder properties, significant separation during coating can occur which translates to detrimental effects on the coating uniformity regarding the composition, micro-structure and dimension. Conventional approaches, for example, result in a deposition layer 252 having a varied chemical stoichiometry from the feedstock 214 due to the different deposition pattern from individual ingredient particles.

In the electrostatic deposition process 200, active material particles, binder particles and conductive material particles (formed as in 101A and 101B) are charged individually when powder particles pass through the space charge zone in a corona-charging, tribo-charging, or direct plate electrode electrostatic charging systems. Due to the chargeability and charge dissipation time differences, individual charged particles deposit on the current collector, generating non-uniformities in the deposited layer.

During formation of the composite particle 101C, the small binder particles and conductive material particles are attached/adhered on the surface of active material particles to form composite particles. During aeration or mechanical conveyance and deposition of the composite particles, consisting of active material particles with surface attachment of binder and conductive material particles, the composite particles are charged and deposited, which results in a uniform deposition on the current collector substrate 254.

Furthermore, due to the high resistivity of binder particles 112, a charge dissipation time of the composite particles is longer than the pure active material particles, which enables the electrostatic forces to have an effect during post coating handling until the curing operation of the binder can be performed. Thus, the composition of the composite particle 101C in the feedstock 214 electrode powder mixture is particularly beneficial for electrostatic deposition to achieve a high degree of uniformity.

Figure 3A:
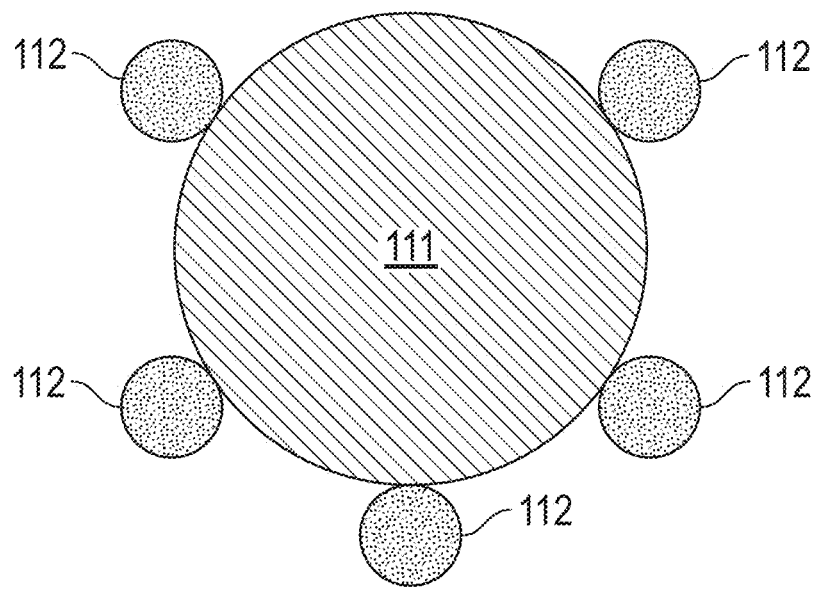
FIGS. 3A and 3B show example compositions of the composite particle of FIG. 1.
Figure 3B:
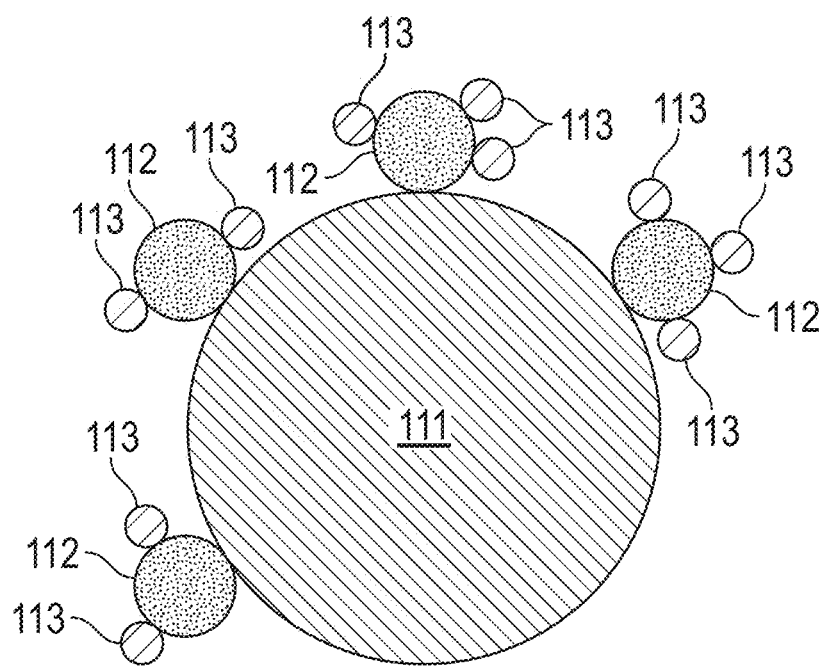

FIGS. 3A and 3B show example compositions of the composite particle of FIG. 1. Referring to FIGS. 1-3A-3B, FIG. 3A shows the composite particle 101C with an AM particle 111 and adhered binder particles 112. FIG. 3B shows that composite particle 101C further includes conductive particles 113. Depending on the mixer 130 arrangement, the composite particle 101C may be formed from concurrent mixing of the conductive particles 113, the active material particles 111 and the binder particles 112. In an alternate configuration, the composite particle 101C further includes combining the conductive particles 113 to adhere to a surface of the binder particles 112, and subsequently forming the composite particle 101C by adhering the combined binder and conductive particles to a surface of the AM particle 111.

To achieve a composite electrode powder mixture formed of composite particles 101C, any mixing/particle coating equipment can be used, such as impact mixers or shear mixers. The binder agglomerates are broken down to form sub particles and conductive material agglomerates are broken down to smaller particles. These sub particles are attached/adhered relative to the surface of active material particles via surface fusion, Van Der Waal attraction forces, or a variety of potential physical interactions or chemical bonds to produce large enough interaction forces between the individual particles to form an effective composite particle which can overcome particle separation during electrostatic charging, fluidization, mechanical conveyance, and/or deposition processes.

Figure 4:
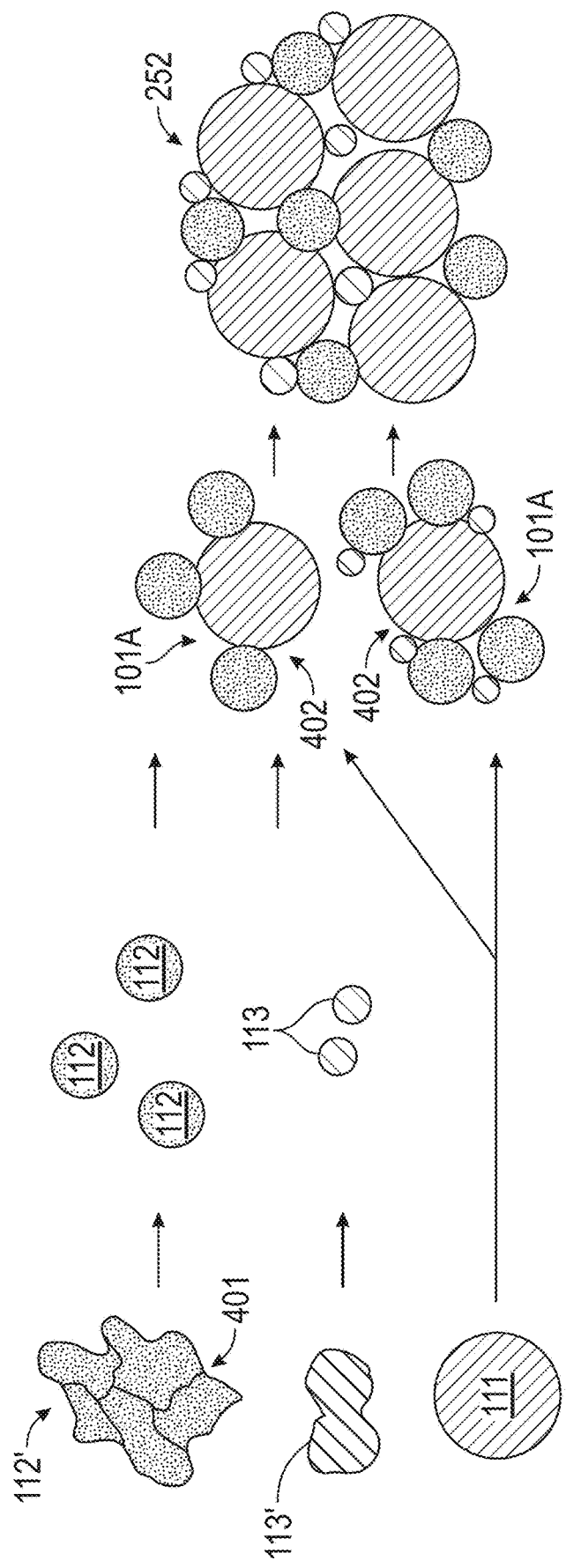
FIG. 4 shows a progression through the formation of the composite particle of FIGS. 1-3B.

FIG. 4 shows a progression through the formation of the composite particle of FIGS. 1-3B. An important feature of the mixing and agitation is to break agglomerates 112' of binder into sub particles 112, if such agglomerates exist in the raw material source. Agitation also reduces conductive particles 113' into smaller sub particles 113 better suited for adherence relative to the AM particles 111. Mixing/agitation is sufficient to break the interaction forces 401 between agglomerates, and also adheres the binder 112 relative to the AM particle 111 with bonding forces 402 greater than separation forces experienced through the electrostatic deposition system 200, maintaining the morphology of the composite particle 101C and providing uniform deposition of the layer 252.

The sizes shown in FIG. 4 are illustrative and for example purposes only. In actual production, it is expected that the size of the binder sub particles 112 will range between 0.1%-70% of an average size of the active material particles 111. It is beneficial if the average sub particle size of binder is less than 10% of the active material when the mean particle size of the active material is more than 5 µm. When the mean particle size of the active material is less than 5 µm, the preferred average sub particle size of binder is less than 70% of the active material.

The granular feedstock 150 can be expected to exhibit variations in particle sizes, and generally a range in sizes is expected and normal. Rogue particles outside the ranges denoted herein will be unlikely to have a negative effect, as long as the overall ranges exhibit a typical distribution and average. A similar distribution range is tolerable for agglomerates and sub particles as discussed above; not all agglomerates/secondary particles can be expected to always break down with exacting uniformity.

The sub particle size of the conductive material is 1-100% of the average sub particle size of binder. The sub particle size of the conductive material is preferred to be less than 30% of the average sub particle size of binder. From the constituent or ingredient particles, it may be that not all of the binder 112 and conductive particles 113 adhere relative to an active material particle 111. In the electrode powder mixture, more than 50% weight of binder sub particles should be attached relative to the surface of active material particles. It is preferred that more than 80% weight of binder sub particles are attached relative to the surface of active material particles. More than 50% weight of conductive sub particles attach relative to the surface of sub particles of the binder. And more than 50% binder/conductive composite particles attach relative to the surface of active material particles. It is preferred that more than 80% weight ratio of the binder and conductive material are attached relative to the surface of active material particles.

If the composite electrode mixture does not contain conductive material(s), the binder sub particles are directly attached relative to the surface of active material particles.

The active material powder, binder powder and/or conductive material powder can be loaded and mixed in a mixer at the same time. To enable better breakage of the binder and conductive agglomerates and an increased interaction between sub particles of binder and conductive material, it is preferred to pre-mix the binder and conductive material, followed by mixing with the active material powder.

Some additional particle stock sizing is as follows. The sub particle size of the conductive material is 1-100% of the average sub particle size of binder. The sub particle size of the conductive material is preferred to be less than 30% of the average sub particle size of binder.

In alternate arrangements, methods to attach/adhere binder/conductive particles relative to the active material particles are not limited to dry powder mixing as described herein. For example, in one exemplary embodiment, binder/conductive material particles can be coated onto the active material particles through mixing suspension or solution of binder/conductive material with the active material powder. In another exemplary embodiment, binder particles can be coated onto/relative to the surface of active material particles through a spray drying method.

In a particular use case, the mixer 130 employs a high-shear mixer to agitate an NCM/binder/CB powder mixture with standard binder sub particle size for electrostatic deposition. The high-shear mixer offers unique rotating mixing pan with built-in an eccentric mixing tool. Mixing speeds in the range of 1 to 30 m/s can be set to disperse and mix particles with different sizes. Active material (NCM) with size around 10 μm, PVDF binder with a primary size of 200-300 nm, and conductive carbon with a primary size of 40-50 nm were used in this example. AM/binder/CB particles with 96:2:2 weight ratio was mixed using a high-shear mixer for 30 mins. SEM imaging of the mixed particles shows coating of CB and binder on the surface of AM.

Examples

1. Material Preparation and Electrode Preparation with Electrostatic Spray Deposition Batches of 700 g powder mixture containing heat treated NMC, PVDF, and carbon black with a weight ratio of 90:7:3 were loaded into a high-shear mixer. Mixing studies were conducted with different mixing speed and mixing time (Sample 1: 12 m/s, 10 min; Sample 3: 20 m/s, 20 min; Sample 4: 25 m/s, 20 min).

The mixed NMC powder was loaded into a hopper in an electrostatic spray deposition system. The dry powder was fluidized by carrying gas under vibration. The fluidized powder was charged by a corona electrostatic spray gun and deposited on a 15 μm thick grounded Al foil. The coating side of the Al foil was pre-coated a PVDF interface layer with a thickness less than 1 μm applied by electrostatic spray deposition technique. The deposited sample was heated in a hotplate for about 1 hr at 250° C. to melt the binder. Finally, the annealed sample was pressed using a roller press to a desired thickness to achieve 35% porosity. This electrode sample is ready for SEM/EDS, adhesion and electrochemical test.

2. SEM/EDS Tests of Samples 1, 3 and 4

Figure 5A:
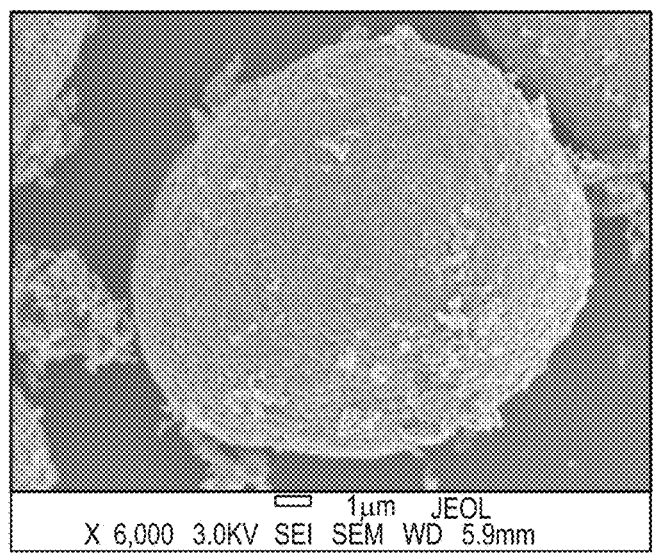
FIGS. 5A-5C are SEM images of mixed powders for Sample 1, Sample 3 and Sample 4, respectively.

The mixed powder samples were analyzed by SEM/EDS to evaluate the deagglomeration of PVDF/carbon particles and the coating of PVDF/carbon on NMC particles. As shown in FIG. 5A, although few agglomerations of PVDF/carbon can be seen attaching to the NMC surface, the majority of the NMC surface is exposed. The NMC surface texture is clearly visible. This shows that the surface of NMC is barely covered by PVDF/carbon particles under 12 m/s, 10 min of mixing.

Figure 5B:
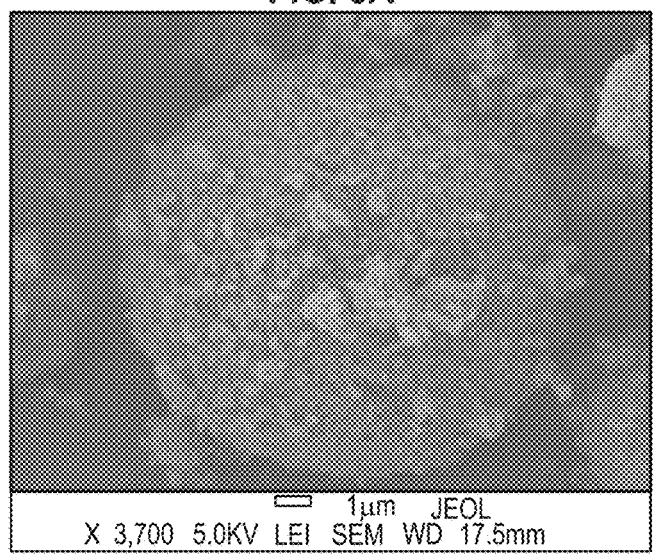
Figure 5C:
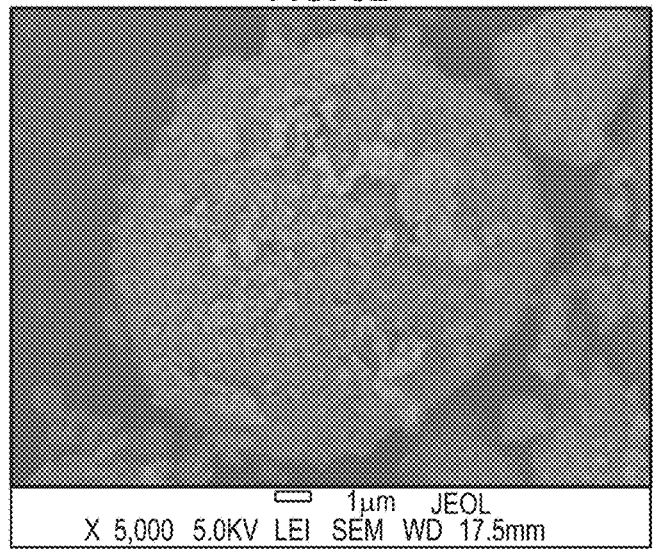

As the mixing intensity increases to 20 m/s, 20 min (Sample 3; FIG. 5B), and 25 m/s, 20 min (Sample 4, FIG. 5C), the surface of NMC particles is covered entirely by PVDF/carbon.

Figure 6A:
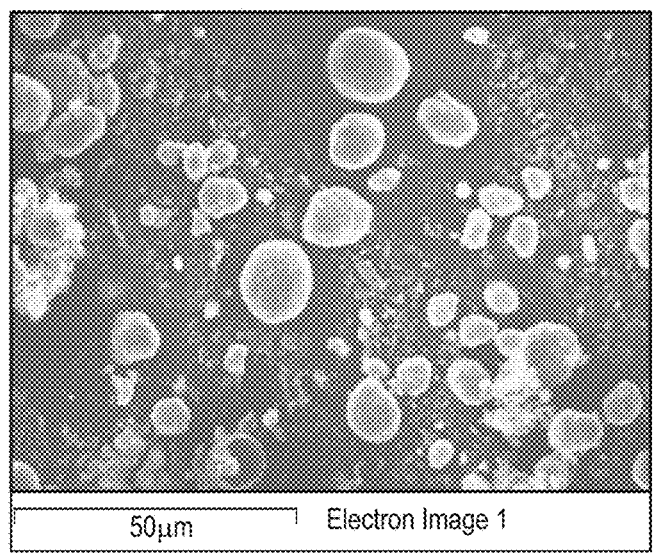
FIGS. 6A-6C are SEM images of larger areas of mixed powders for Sample 1, Sample 3 and Sample 4, respectively.
Figure 6B:
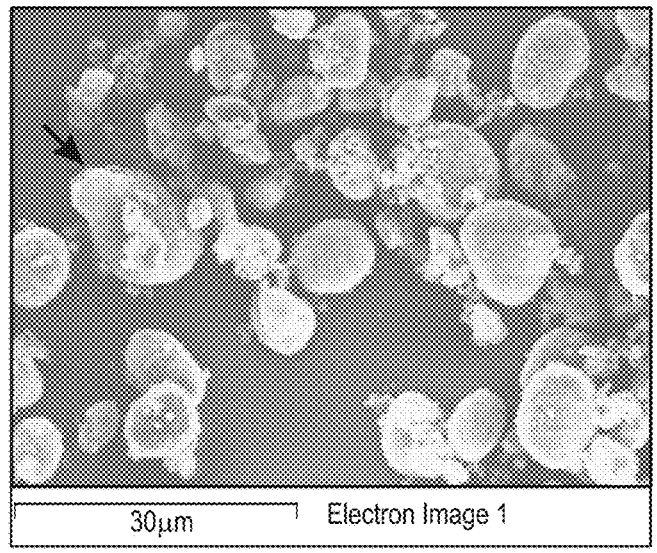
Figure 6C:
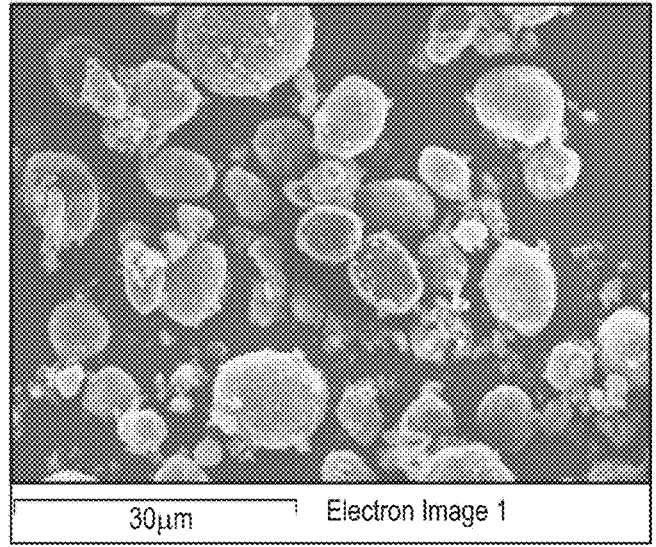

FIGS. 6A-6C show SEM images of larger areas of the mixed powders for Sample 1 (FIG. 6A), Sample 3 (FIG. 6B) and Sample 4 (FIG. 6C).

Figure 7A:
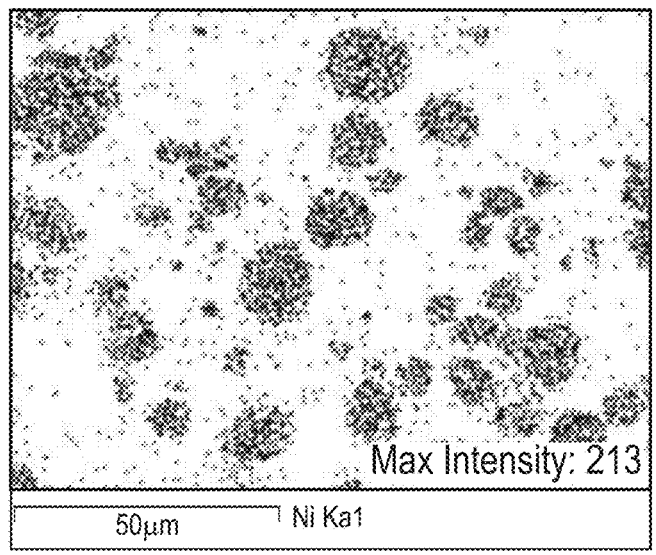
FIGS. 7A-7C are EDS images (nickel mapping) of mixed powders for Sample 1, Sample 3 and Sample 4, respectively.
Figure 7B:
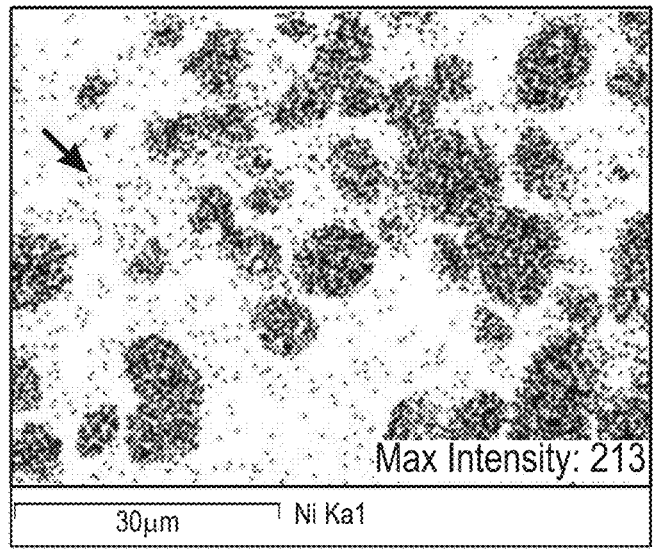
Figure 7C:
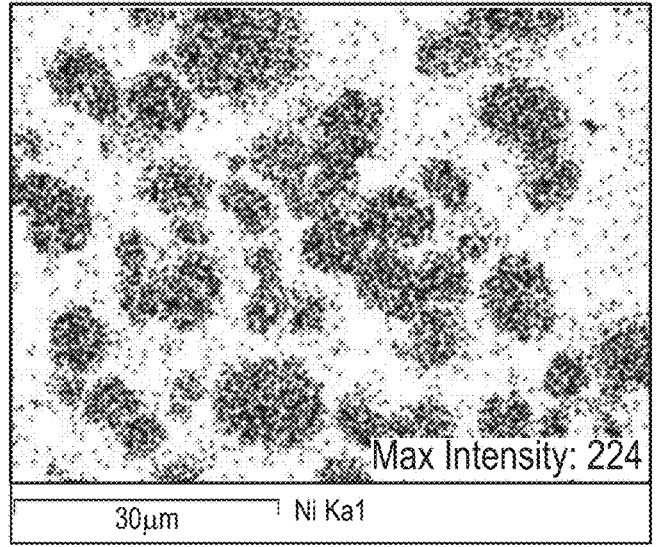
Figure 8A:
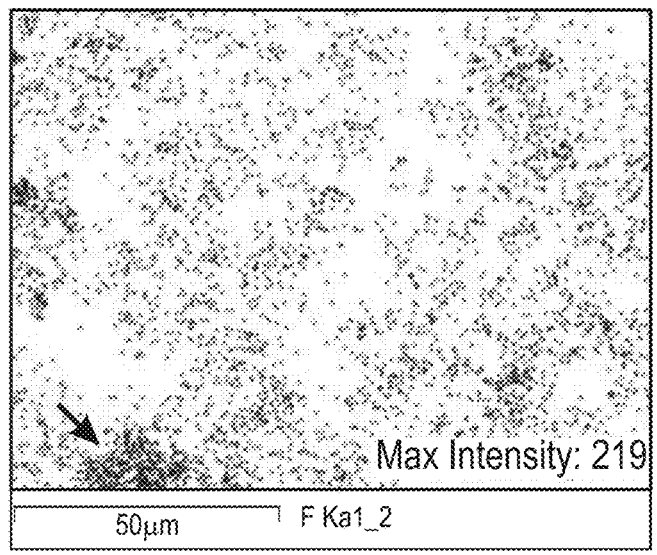
FIGS. 8A-8C are EDS images (fluorine mapping) of mixed powders for Sample 1, Sample 3 and Sample 4, respectively.
Figure 8B:
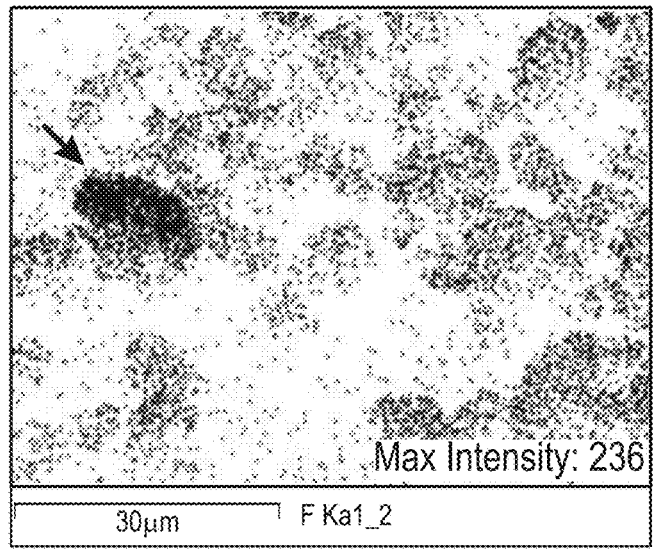
Figure 8C:
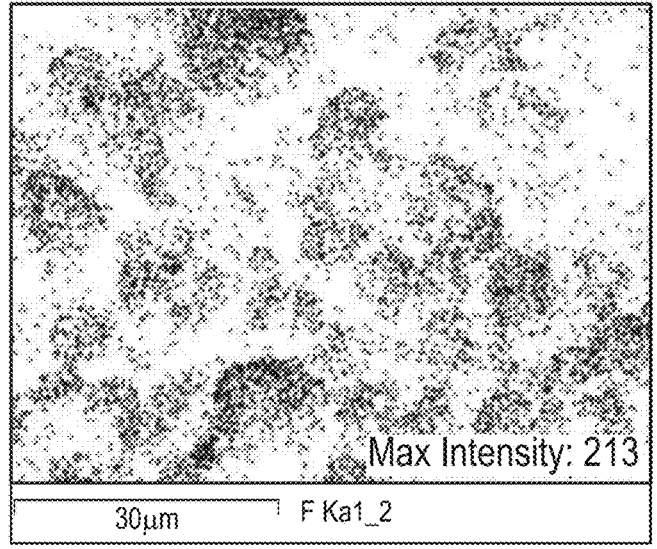

The corresponding EDS results are shown in FIG. 7A (Sample 1; nickel mapping), FIG. 7B (Sample 3; nickel mapping) and FIG. 7C (Sample 4; nickel mapping), and in FIG. 8A (Sample 1; fluorine mapping), FIG. 8B (Sample 3; fluorine mapping) and FIG. 8C (Sample 4; fluorine mapping). ImageJ was used to process the element mapping images and remove the effect of signal intensity on image quality. The maximum intensity of each element is reported in the image.

As shown in FIGS. 7A-7C, the distribution of nickel can be completely mapped on to the corresponding SEM images. The general shape of individual NMC particles is captured by nickel mapping. Mapping of fluorine (FIGS. 8A-8C), which is an indication of PVDF content, shows distinctive differences between the three mixed materials.

The general spherical shape of NMC particles is not visible from the fluorine mapping image of 12 m/s, 10 min mixing (FIG. 8A). This indicates that most of the PVDF particles are still randomly placed in the mixed powder instead of attached to the NMC particles. The tightly grouped black spots (indicated by arrow) around the bottom left corner of the image also indicates that some agglomerations of PVDF particles are not broken under the low intensity mixing.

Fluorine starts to converge to illustrate the spherical shape of NMC particles with higher intensity mixings, as shown in the 20 m/s, 20 min (Sample 3; FIG. 8B), and 25 m/s, 20 min (Sample 4; FIG. 8C). The tightly grouped black spots (indicated by arrow) around the center left of the fluorine mapping of the 20 m/s, 20 min mixing (Sample 3; FIG. 8B) indicates a large agglomeration of PVDF particles. Although it is visible that an NMC particle is behind this large agglomeration of PVDF particles from the corresponding SEM image in FIG. 6B, the PVDF agglomeration completely blocks the x-ray spectra of nickel of being collected by the detector. Therefore, it is shown as a vacancy in the corresponding nickel mapping image (indicated by arrow). Large PVDF agglomerations are not visible in powder mixed by 25 m/s, 20 min (Sample 4). A relatively homogeneous distribution of PVDF particles is achieved and visible from the corresponding fluorine mapping image of FIG. 8C.

3. Adhesion Test

Figure 9:
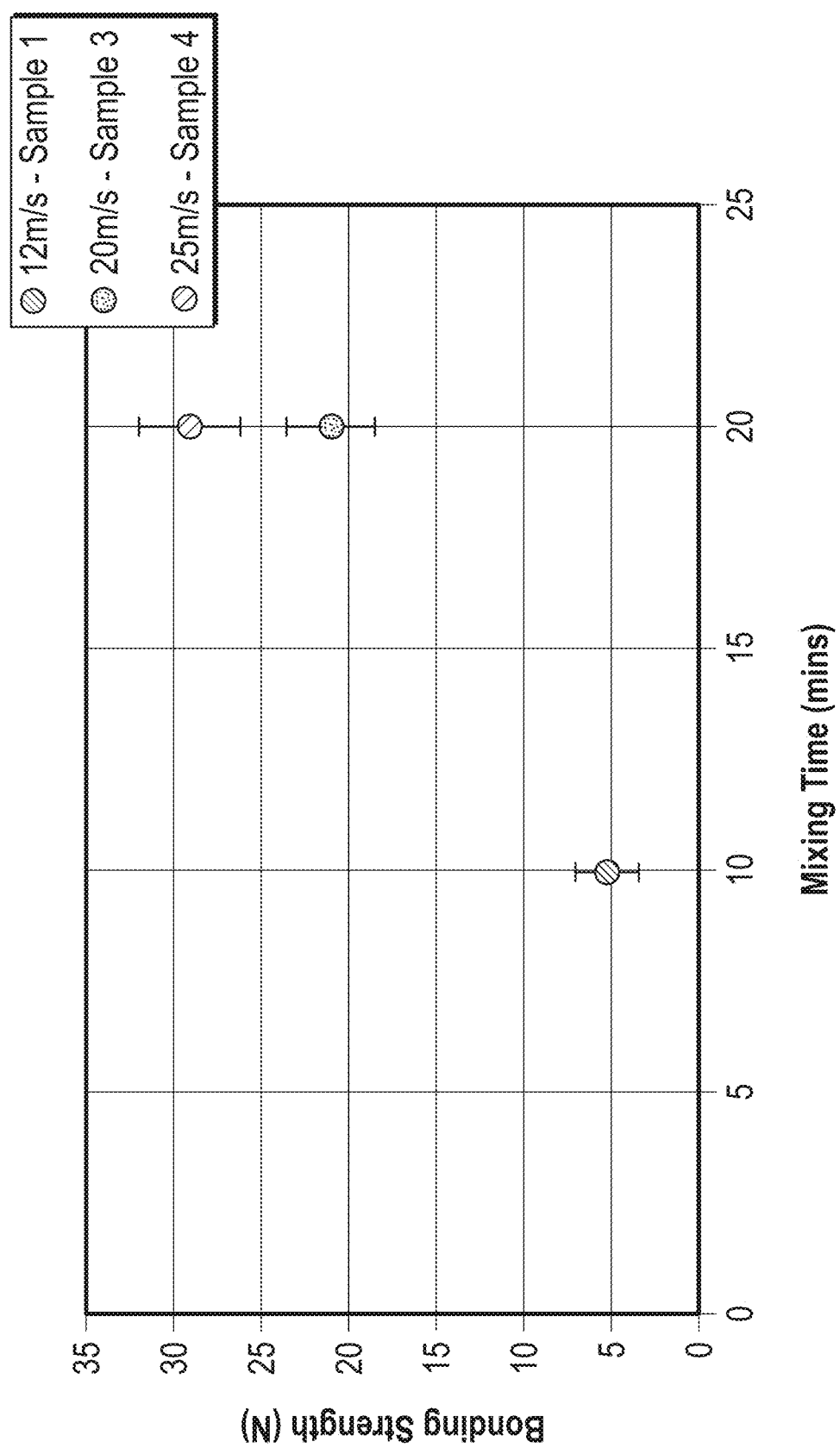
FIG. 9 is a plot showing bonding strength for electrodes prepared by electrostatic spray deposition with powders with various mixing time and speed, according to the present disclosure.

The bonding strength of the electrode was evaluating using a pull-off test. The electrode sample was cut to a disc with a diameter of 14.3 mm. The electrode disc was attached onto a flathead tip with a diameter of 12.7 mm using double-side tape. The disc was attached to a base with a double-side tape with a 15N compression force, followed by pulling and recording the maximum pulling force that results in disc collapsing. FIG. 9 is a plot showing bonding strength for electrodes prepared by electrostatic spray deposition with powders with various mixing time and speed, i.e., Samples 1, 3 and 4. The plot of FIG. 9 shows the samples prepared with longer mixing time demonstrated better adhesion.

The disclosed electrochemical energy storage devices may be incorporated into various assemblies/sub-assemblies, e.g., a rechargeable lithium battery, a Li-ion battery, a rechargeable lithium sulfur battery, a solid state battery, a rechargeable sodium battery, and/or a sodium-ion battery.

While the system and methods defined herein have been particularly shown and described with references to embodiments thereof, it will be understood by those skilled in the art that various changes in form and details may be made therein without departing from the scope of the invention encompassed by the appended claims.

The invention claimed is:

1. A method for forming an electrode for an anode or a cathode, comprising:
    providing a first source of bulk particles consisting of deagglomerated binder particles having a primary particle size of 100-1000 nm;
    providing a second source of bulk particles consisting of active material particles;
    mixing the deagglomerated binder particles and the active material particles to form a plurality of dry mixed composite particles wherein the deagglomerated binder particles surround each of the active material particles;
    electrostatic depositing of the plurality of dry mixed composite particles onto a surface of a conductive substrate or onto a layer that is bound to the surface of the conductive substrate;
    wherein the one or more active particles are positive active particles or negative active particles.

2. The method of claim 1, wherein the electrostatic depositing process is selected from the group consisting of corona-charging electrostatic deposition, tribo-charging electrostatic deposition and direct electrode induction charging deposition.

3. A method of forming a battery, comprising
    providing an anode and a cathode;
    positioning a separator between the anode and the cathode;
    adding an electrolyte to form the battery;
    wherein at least one of the anode or the cathode is formed by the method of forming an electrode of claim 1.

4. A method for forming an electrode, comprising:
    deagglomerating an agglomeration of binder material to form deagglomerated binder particles having a primary particle size of 100-1000 nm;
    mixing active material particles and the deagglomerated binder particles to form a plurality of dry mixed composite particles, wherein the deagglomerated binder particles surround each of the active material particles;
    electrostatic depositing of the plurality of dry mixed composite particles onto a surface of a conductive substrate or onto a layer that is bound to the surface of the conductive substrate;
    wherein the active particles are positive active particles or negative active particles.

* * * * *